(12) United States Patent
Duarte Santiago et al.

(10) Patent No.: US 8,067,657 B2
(45) Date of Patent: Nov. 29, 2011

(54) PROCESS TO OBTAIN N-PARAFFINS FROM VEGETABLE OIL

(75) Inventors: Fernando Antonio Duarte Santiago, Niterói (BR); Wlamir Soares Nogueira, Rio de Janeiro (BR); Anita Eleonora Ferreira Fontes, Rio de Janeiro (BR); Lelia Maria Ximenes Lowe, Rio de Janeiro (BR); Jefferson Roberto Gomes, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 222 days.

(21) Appl. No.: 11/785,418

(22) Filed: Apr. 17, 2007

(65) Prior Publication Data

US 2007/0260102 A1 Nov. 8, 2007

(30) Foreign Application Priority Data

Apr. 17, 2006 (BR) .................................... 0601403

(51) Int. Cl.
*C07C 4/00* (2006.01)
*C07C 1/00* (2006.01)
(52) U.S. Cl. ...................................... 585/733; 585/240
(58) Field of Classification Search .................. 585/733, 585/240, 250, 13–14
See application file for complete search history.

(56) References Cited

U.S. PATENT DOCUMENTS

| 2,163,563 | A | | 6/1939 | Schrauth et al. |
| 4,300,009 | A | | 11/1981 | Haag et al. |
| 4,992,605 | A | * | 2/1991 | Craig et al. .................. 585/240 |
| 5,233,109 | A | | 8/1993 | Chow |
| 5,705,722 | A | | 1/1998 | Monnier et al. |
| 5,972,057 | A | | 10/1999 | Hayafuji et al. |
| 6,053,007 | A | * | 4/2000 | Victory et al. .................. 62/619 |
| 2005/0262759 | A1 | * | 12/2005 | Tort et al. ........................ 44/301 |
| 2007/0175795 | A1 | * | 8/2007 | Yao et al. ...................... 208/142 |

OTHER PUBLICATIONS

Material Data Sheet for Light Cycle Oil Valero.*

* cited by examiner

*Primary Examiner* — Ellen McAvoy
*Assistant Examiner* — Pamela H Weiss
(74) *Attorney, Agent, or Firm* — Nixon & Vanderhye P.C.

(57) ABSTRACT

The process described by this invention involves the hydroconversion of vegetable oils appropriately selected for the production of N-paraffins, through hydrotreatment of a stream of vegetable hydrocarbon oils in and/or natural fats that may be used in a pure state or in a mixture with mineral hydrocarbon oil. This mixture flow is submitted to the process of hydrotreatment, obtaining as a result, a product flow with an elevated content of N-paraffins in the range of $C_{10}$-$C_{13}$. This process provides an alternative to the usual process that uses a mineral hydrocarbon oil load (petroleum kerosene of paraffin base) to produce $C_{10}$-$C_{13}$ N-paraffins that are raw materials for the production of detergents (LAB), being, therefore, especially advantageous for use in situations where kerosene is a limiting factor for producing N-paraffins, resulting in a product of good quality with a reasonable gain in the production of N-paraffins.

9 Claims, 3 Drawing Sheets

CONTENT OF $C_{10}$-$C_{13}$ N-PARAFFINS OF
PRODUCT AFTER HDT

INCREASE IN THE PRODUCTION OF $C_{10}$-$C_{13}$ PARAFFINS

INCREASE IN THE PRODUCTION OF $C_{13}^+$ PARAFFINS

Percentage of Increase in Production

PROCESS TO OBTAIN N-PARAFFINS FROM VEGETABLE OIL

CROSS REFERENCE TO RELATED APPLICATION

This application is based upon, claims the benefit of, priority of, and incorporates by reference, the contents of Brazilian Patent Application No. PI 0601403-8 filed Apr. 17, 2006.

FIELD OF THE INVENTION

This invention falls within the processing field of hydroconversion, more specifically, to processing by hydroconversion of vegetable oil loads added to petroleum loads, to be precise, to hydrocarbon oils of mineral origin, for obtaining N-paraffins.

BACKGROUND OF THE INVENTION

N-paraffins are raw materials for the production of biodegradable detergents, insecticides, and solvents, among other products, that are usually obtained from hydrocarbons that come from mineral sources such as petroleum.

Commercially, N-paraffins are produced by the process of adsorption in a trickle bed, after hydrotreatment, from the raw material kerosene.

Molecular screens are usually used as the adsorbent elements. These contain synthetic zeolite crystals in their structure, with limited and uniform sized pores, in such a way that only N-paraffins contained in a gaseous hydrocarbon mixture are adsorbed through these pores. Compounds called isomers (isoparaffins, naftenes and aromatics), which do not have a linear chain, pass through the existing empty spaces, and flow out through the top of the adsorber. However, a small fraction of these compounds are retained in the mesopores of the adsorbent material, which contaminates the product.

Consequently, after adsorption, the product containing the normal paraffins is hydrotreated, in order to determine its purity, and is fractioned right afterwards in $N-C_{10}/C_{13}$ and $N-C_{14}/C_{15}$ streams.

Due to the inherent costs of obtaining raw material hydrocarbon derived from petroleum, which is aggravated, in this case, by the need for paraffinic petroleum such as, the Brazilian petroleum baiano brand, which is becoming quite rare, and taking account, on a worldwide level, environmental questions which are being greatly affected by economic activities of modern civilization, the search for alternative sources has stimulated many researches. Renewable sources of energy have been of particular interest because in addition to contributing to the improvement of the environment, they are able to become an extra source of energy for some regions of the world.

In this context, agricultural inputs have been the object of rising interest, as far as its exploration being as a new way of utilization or being as insert them to other traditional inputs, make agricultural inputs economically attractive.

Important examples of this are vegetable oils, which are basically made up of fatty acid triglycerides, and are directly extracted from vegetable seeds, through pressing processes and/or extraction using organic solvents. In addition to their recognized applications in food industries, vegetable oils are also used in the cosmetic industry, and in the production of soaps, dyes, lubricants, and plastics among others.

Brazil, due to its great expanse of land, and its privileged geographical situation, agriculture is particularly relevant as a factor of great importance for regional socioeconomic development, through the exploration of extractivist agricultural landholding cultures for use in various productive sectors of the economy, including in the production of products that could be considered renewable sources of energy.

Thus, there is a great effort in Brazil to make the use of vegetable oils viable in the energy sector currently in practice, that in many cases besides it be economically more favorable, it produces a significant advantage for the environment through the creation of products that are less aggressive and less polluting to the environment.

For this, there is a need to develop new technologies that produce inputs and products that comply with environmental regulations which are more rigid.

Related Technique

Hydrotreatment is a catalytic process, in which hydrogen is used for the purpose of stabilizing various products compound of hydrocarbon and for eliminating undesirable compounds such as: sulfur, aromatics, nitrogen, and olefins.

As known in the state of the art, the principal reactions that occur in the reactor during the hydrogenation process are:

a. Saturation of olefins—elimination of unsaturated chains.

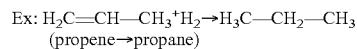
(propene→propane)

b. Saturation of aromatics—transformation of the aromatics in naphthenes and then transforming these in saturated compounds.

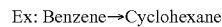

c. Hydrodesulfurization (HDS)—elimination of sulfur
MERCAPTANS (R—SH):

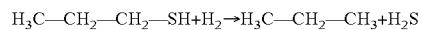

SULFIDES (R—S—R)

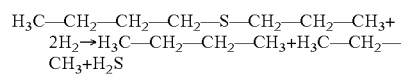

where the removal of the compounds above mentioned increase the concentration of butanes and propanes in the stream.

THIOPHENES—their hydrogenation increase the concentration of butanes.

DISULFIDES (R—S—S—R)—the removal of these compounds increase the concentration of methane and hydrogen sulfide.

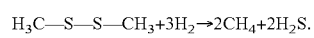

d. Hydrodenitrogenation (HDN) elimination of nitrogen and after this reaction, an increase in the concentration of pentane and ammonia occurs.

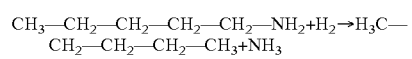

e. Deoxygenation→elimination of oxygen f. Hydrocracking→when occurs a large molecules cracking producing light gas.

In the case of the production of N-paraffins, the hydrotreatment stage follows the initial stage of adsorption, aiming purifying the N-paraffins stream thus obtained.

At this point of the usual process, this invention adds a percentage of vegetable hydrocarbon oil into the industrial process stream, producing a mixture with the mineral hydrocarbon oil, which will be hydrotreated to obtain the N-paraffin product, which will be explained in more detail further.

According to production and/or operational needs, the vegetable hydrocarbon oil may also be submitted to hydrotreatment (HDT), in its pure state, on the condition that it be properly chosen according to the length of its chain, which preferably must present the highest possible content in the range of $C_{12}$-$C_{14}$ in order to be more compatible to be submited to the process.

Thus, the HDT of pure vegetable hydrocarbon oils, or in a mixture of any proportion with mineral hydrocarbon oils, will produce N-paraffins $C_{10}$-$C_{13}$ suitable for use as inputs, such as, raw material for the production of detergents, since the load of vegetable hydrocarbon oil to be introduced into the treatment process be properly selected for production of N-paraffins within the range of interest of $C_{10}$-$C_{13}$, and following using the already known hydrorefining technology, and by the use of commercial catalysts available.

The literature of patent presents some documents in the hydrogenation of vegetable oil medium, but these documents do not consider in their scope the intended range covered by this invention.

For example, the hydrogenation of vegetable oils combined with mineral oil is known by the U.S. Pat. No. 2,163,563, which processes vegetable oils mixed in a stream of mineral oil in the presence of hydrogen at high pressure [5 MPa to 50.6 MPa (50 to 500 atmospheres)], using a reduced Ni catalyst supported in alumina. The converted vegetable oil is separated by distillation and the mineral oil is recycled. However, this patent does not involve hydrotreatment of a combined load of petroleum and vegetable oils through an HDT process.

U.S. Pat. No. 4,300,009 describes a catalytic conversion of anabolites (substances formed in the anabolic process) as resins, vegetable oils and fats in liquid hydrocarbons, in the presence of zeolites with an effective pore size bigger than 5 Angstrom. The products generated have the boiling point at the range of gasoline's boiling point.

U.S. Pat. No. 5,233,109 describe a synthetic crude oil produced by catalytic cracking of a biomass material such as, a vegetable or animal oil in the presence of a catalyst that is alumina with or without silica and/or a zeolite component and/or rare earths and/or sodium oxide. The reaction is carried out in the presence of a carrier gas that may be air, nitrogen, argon, hydrogen and a hydrocarbon obtained in petroleum refining.

U.S. Pat. No. 5,705,722 describes a process to produce additives for diesel fuel with an elevated number of cetane and it functions as an agent to improve ignition of the fuel. In the process, the biomass, containing a high proportion of unsaturated fatty acids, wood oils, animal fats and other mixtures, is submitted to hydroprocessing, placing the load in contact with gaseous hydrogen in the presence of a hydroprocessing catalyst under hydroprocessing conditions in order to obtain a mixture of product. This mixture is then separated and fractioned to obtain a hydrocarbon product with boiling point at the range of diesel's boiling point, being this product the additive with a high cetane number. It is not mentioned within this document concerning the addition of a petroleum hydrocarbon to the biomass load which is being hydroprocessed.

U.S. Pat. No. 4,992,605 uses hydrorefining with sulfided catalyst (NiMo and CoMo) in the presence of hydrogen (pressure of 4 to 15 MPa) and temperature in the range of 350° C. to 450° C.

This patent describes the processing of pure vegetable oils such as canola, sunflower, soy, palm and wood oil that is a waste product from the wood pulp industry. The final objective is to obtain a stream with a high cetane number to be added to the diesel in the refinery; however, specifications at low temperatures are damaged. This patent does not consider a mixture of a hydrocarbon with vegetable oil in the hydrorefining.

U.S. Pat. No. 5,972,057 describes the transesterification of vegetable oils, mainly spent oils used in frying, with methanol and ethanol, in order to produce a fuel similar to mineral diesel fuel, however the process involves the consumption of an expensive reagent (alcohol) but its by-products (glycerin, etc.) must be separated to avoid damages to the motor.

Therefore, in spite of developments in the technology, there is still a need for a technic to process hydroconversion of vegetable oils which seeks to obtain N-paraffins.

SUMMARY OF THE INVENTION

In a broad sense, the process described by this invention involves the hydroconversion of vegetable oils appropriately selected, through hydrotreatment of a stream of vegetble hydrocarbon oils and/or natural fats that may be used in a pure state or in a mixture with mineral hydrocarbon oil, in a range of 0% to 100% by weight, preferably in a range of 0% to 50% by weight, even more preferably in a range of 0% to 30% by weight of vegetable hydrocarbon oil over the total weight of the mixture to be processed, being the remainder of said mixture made up of mineral hydrocarbon oil. This mixture flow is introduced into the hydrotreatment reactor, under operational conditions detailed below, obtaining as a result, a product flow with an elevated level of N-paraffins in the range of f $C_{10}$-$C_{13}$. The resulting product stream of HDT has a boiling point at the range of kerosene's boiling point.

To convert vegetable oils directly into N-paraffins, it was used, in this invention, a technology of hydrorefining, using commercial catalysts available.

This invention results from the development of a new hydrotreatment process involving a mixture with vegetable oils for the production of a hydrocarbons stream (N-paraffins) in which hydrocracking reactions are used to reduce the number of carbon atoms in the chains of the vegetable oils used, followed by hydrotreatment to remove the oxygenated compounds, and followed by hydrogenation of olefins to remove double bonds. For this, it was used commercial sulfided NiMo catalysts and sulfided CoMo catalysts supported in gamma alumina.

The yield of $C_{10}$-$C_{13}$ N-paraffins in the process of this invention obtained from the HDT reactor output, is on the order of 70%-80% of the processed load in said reactor, with good results regarding the expected life time of the catalyst, foreseing, however, through the process, as it is the usual practice when using catalyst beds. The following by-products are obtained from these operations: $C_1$ to $C_5$ gas, $CO_2$, water and $C_{13}^+$.

In the specific case of this invention, it was seek as an additive component for the hydrotreatement, a short chain vegetable oil ($C_{12}$-$C_{14}$) since this is the characteristic of the product obtained in the N-paraffins production units.

In this research it was found that the oils suitable for application in this invention are lauryl oils such as: palm kernel oil, obtained from oleaginous palm trees (*Elaeis guineensis*, Jacq.), babassu oil (*Orbignya speciosa*, Mart.) Barb. Rodr., and ouricuri oil or licuri oil also obtained from a palm tree (Syagrus Coronata (Martius) Beccari), or any other vegetable oil, as long as it complies with the above mentioned conditions related to the chain size.

The hydroconversion process is described in greater detail further and its claims are stated in the present application.

DETAILED DESCRIPTION OF THE INVENTION

Figure 1:
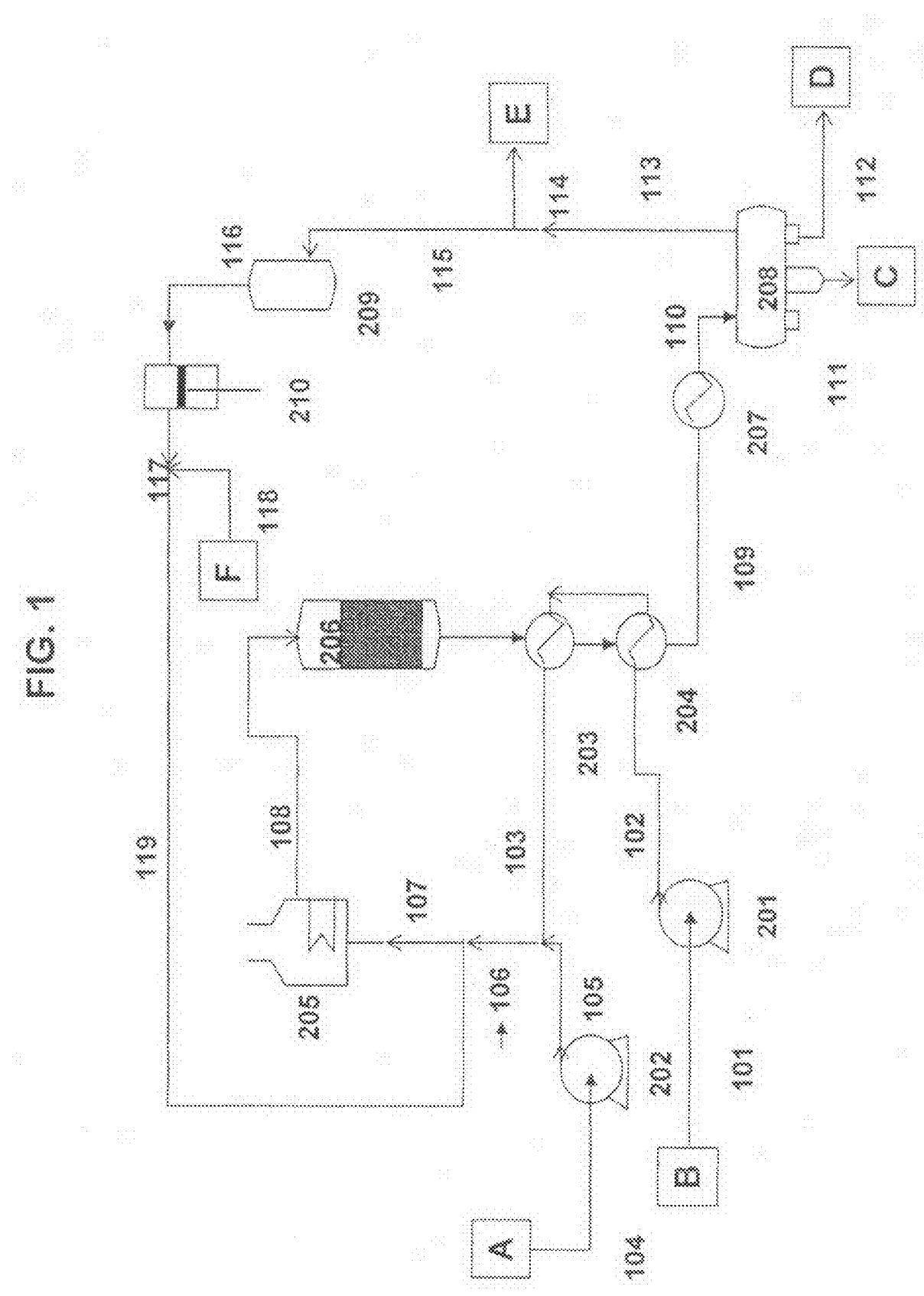
FIG. 1 is a schematic flow chart of the process of the invention.
Figure 2:
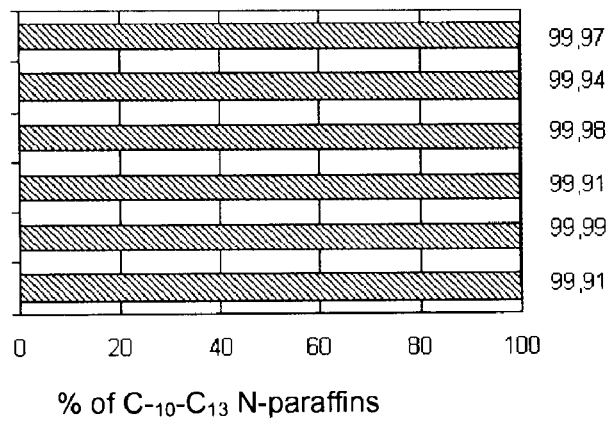
FIG. 2 shows the content of $C_{10}$-$C_{13}$ N-paraffins of a product after HDT in accordance with an embodiment.
Figure 3:
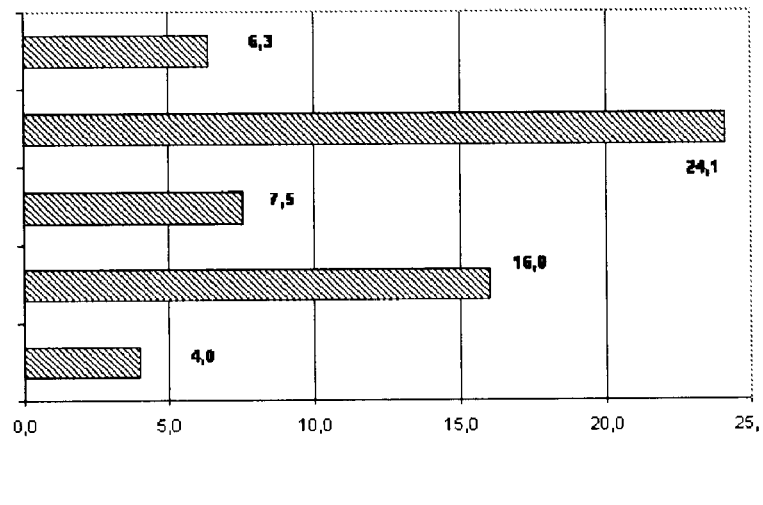
FIG. 3 shows the increase in the production of $C_{10}$-$C_{13}$ paraffins in accordance with an embodiment.
Figure 4:
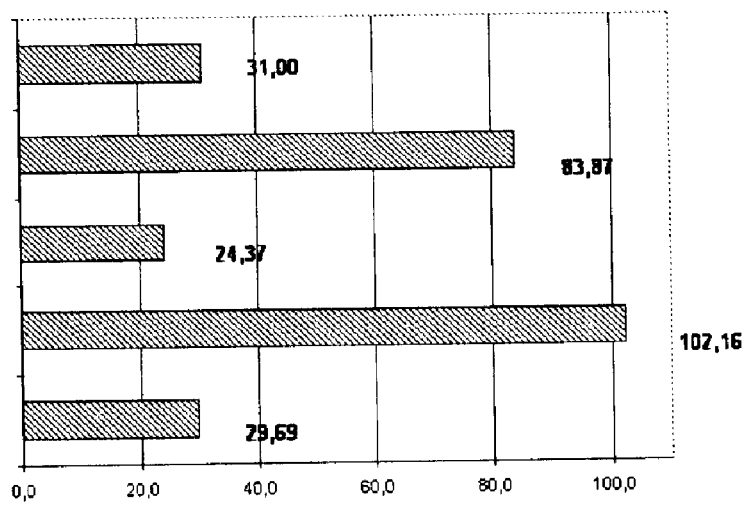
FIG. 4 shows the increase in the production of $C_{13}$+ paraffins in accordance with an embodiment.

As mentioned above, the co-processing of vegetable oils mixed with mineral hydrocarbon oil in industrial hydrotreatment units is an alternative to increase the production of high aggregate value N-paraffins from raw materials derived from renewable sources, such as, short chain vegetable oils ($C_{12}$-$C_{14}$), being the following oils preferable material for the process described in this invention: the palm kernel oil (Elaeis guineensis), babassu oil (*Orbignya speciosa*), and ouricuri/licuri oil (*Syagrus coronata* (Martius) Beccari), among others.

Another important factor on the operational aspect is that, with the dilution of vegetable oil (V.O.), the industrial unit may operate at lower baseline temperatures, which contributes to reduce costs of the process as a whole.

The hydrotreatment process in accordance with this invention includes, hydrotreatment of a vegetable hydrocarbon oil and/or natural fats that may be used in a pure state, or in a mixture with mineral hydrocarbon oil, in the range of 0% to 100% by weight, preferably between 0% and 50% by weight, and even more preferably between 0% and 30% of vegetable hydrocarbon oil over the total weight of the hydrocarbon mixture to be processed, with the rest of said mixture constituted of mineral hydrocarbon oil, under operational conditions detailed below.

The useful mineral hydrocarbon load in the process is kerosene that is usually obtained from the refinery. Its analysis, together with the data obtained from the mixtures with vegetable oils in the various valued proportions, are found in Table 1 (at the end), which gives the parameters before the mixtured load goes through hydrotreatment.

Table 1 shows that the parameters obtained from mixtures of kerosene with vegetable oils are very close to those represented by pure kerosene load usually used in the process of obtaining N-paraffins.

The catalysts used in hydrotreatment (HDT) are basically metal oxides, that are totally or partially converted into sulfides (active phase) supported in y-alumina (y-$Al_2O_3$).

The conversion of the oxides to sulfides (sulfidation) is carried out in the hydrotreatment reactor itself. The active phase performs the reactions of hydrogenolysis and hydrogenation. The support performs the basic function of supplying a specific elevated area, in which the active components are found dispersed, in the form of small particles. Besides, the support supplies mechanical resistance and thermal stability, preventing sintering (agglomeration of the active phase). The y-alumina has a specific area between 200 and 400 $m^2/g$, with a pore volume of 0.5 to 1.0 $cm^3/g$ and weak to moderate acidity. There is a synergistic effect between the metal sulfides of the VI-B groups, (Mo and W) and VIII (Co and Ni), in the different reactions involved in the process of hydrotreatment, so that the activity of catalysts containing sulfides, from both groups, are quite superior to the activity of individual sulfides. Therefore, mixed sulfides are normally used for the active phase (Co—Mo, Ni—Mo, Ni—W, Co—W), with an optimal ratio between metal group VIII and metal group VI-B staying within a range of 0.33 and 0.54.

Operational Conditions

In the hydrotreatment process to produce N-paraffins, the reaction takes place in the presence of hydrogen under high pressure in the operational range of 7 MPa to 15 MPa, preferably in the range of 10 to 12 MPa. The average temperature of a catalytic bed may vary from 250° C. to 400° C., preferably between 280° C. to 320° C., with a spatial velocity ranging from 0.5 $h^{-1}$ to 2 $h^{-1}$, preferably between 1.2 $h^{-1}$ and 1.6 $h^{-1}$. The catalytic bed may be divided into two or more stages with cold hydrogen injection between the stages for temperature control, with a ratio of hydrogen/mixture ranging between 200 NL of hydrogen/L of mixture to 1000 NL of hydrogen/L of mixture, preferably between 300 NL of hydrogen/L of mixture to 1000 NL of hydrogen/L of mixture.

The experimental reaction conditions for hydrotreatment are determined by typical conditions of an HDT N-paraffins unit. Tests were planned in such a way that for one same experimental condition, it was always realized also a test with a pure mineral hydrocarbon oil (M.O.) without the addition of vegetable oil (V.O.), in order to determine the efficiency caused by the presence of the vegetable oil being studied.

The process of the invention will be operational described below with reference to FIG. 1.

In accordance with FIG. 1, the mineral oil (B) is directed through the line (101) to the pump (201), that elevates the pressure in the stream to a operational pressure, after the oil is driven through the line (102) towards the heat exchangers battery (204) and (203), that heats the oil, recovering heat from the products of the process. The heated product is pressurized and directed to the line (103). The vegetable oil (A) enters into the unit through the line (104) and is pumped by the pump (202), which pressurizes the stream (105) to pressure of the unit. Later the stream (105) is mixed with the stream (103), producing the stream (106), that in its turn is mixed with the recycled gas stream (119) rich in hydrogen, creating the stream (107). The stream (107) is conducted to the oven (205), where it is heated up to the inlet temperature of the reactor (206) and form a stream (108).

The reactions are exothermic and in this way, the increase of temperature occurs along the catalytic bed, and thus the N-paraffin product from the output of the reactor (206) has a temperature higher than the entry (or inlet) temperature, creating the stream (109) that has a $C_{10}$-$C_{13}$ level varying from 70%-80%, where part of the heat is recovereded through the exchangers (204) and (203) that heats the mineral oil load (B). The stream (109) passes through another cooler (207), this time using refrigerated water, to condensing light products formed that follow by (110), which are separated from the gaseous stream in the vase (208), where a stream (111) of water produced by the process is also separated and is sent to the acid water system (C) of the refinery for treatment.

The hydrocarbon stream (112), containing the N-paraffins product coming from hydrocracking of the vegetable hydrocarbon oil and the mineral hydrocarbon oil is directed to a rectifier tower (D) (not shown), where sulfide gas and ammonia produced by the HDS and HDH reactions, respectively, are removed.

The gaseous stream (113) coming from (208), is rich in unreacted hydrogen, but also may contain high levels of sulfide gas, that may damage reactions; therefore, the level of sulfide gas is kept below a minimum baseline level through a purge (E) stream (114). The purged stream (115) passes through the reactor crucible (or vase) (209) to retain any liquid compound that has been dragged, creating the stream (116), which is compressed by the compressor (210) up to the entry (or inlet) pressure in the furnace (205), creating the stream (117). The stream (117) is mixed with the stream (118), which contains pure hydrogen to compensate the consumed hydrogen, producing a stream rich in hydrogen (119) which is then mixed with stream (106) in the entrance of the furnace (205).

The N-paraffin product at the bottom of the rectifier tower (D) passes through two fractionators (not shown in the Figure) used to separate the three streams, $C_{10}$-, $C_{10}$-$C_{13}$ and $C_{13}^+$.

The proof of technical viability of the proposed process shall be described below based on the evaluation of the quality and increase of N-paraffins production.

Normal $C_{10}$-$C_{13}$ Paraffin Content

The quality of the product after processing in accordance with this invention, measured at the outlet of the rectifier tower (D), is associated to the content of purity obtained in the $C_{10}$-$C_{13}$ N-paraffins streams which were analyzed by gas chromatography, shows concentration over 98% by weight, since the maximum content allowed for branching in these products should not be over 2%.

As expected from the concept of the invention, the liquid product that results from the processing of the mixture of vegetable hydrocarbon oil and mineral origin in accordance with the invention, would be basically made up of linear hydrocarbons, with contents of $C_{10}$-$C_{13}$ N-paraffins very similar to those obtained using only kerosene as the sole input, as shown by Graph 1.

In accordance with this parameter, the results obtained through the hydrotreatment processing of a mixture of vegetable and mineral loads in accordance with this invention, indicates a mass increase in the production of N-paraffins, mainly from the $C_{10}$-$C_{13}$ stream which shows the viability of using this type of mixture when mineral raw material in refineries is not sufficient to fulfill the demand for $C_{10}$-$C_{13}$ N-paraffins while continuing to use the same industrial process.

Density of the Products

Table 2 (at the end) shows that depending on the concentration of vegetable oil in the hydrotreatment load, the density and the refractory index of the product may be maintained constant or present a slightly higher values than the values presented by products produced by processing a load of pure kerosene, and that these small alterations are not significant enough to influence the results when employing the intended process of mixtures, such as those presented below.

Analysis of the Aromatics Contents

Another specification to be controlled is the product aromatic content that must be lower than 0.7% by weight.

In Table 3 (at the end) we can see that the addition of vegetable hydrocarbon oil maintains or reduces the level of aromatics in the final product, when compared to processing a load of pure kerosene, which in environmental terms contributes very favorably to the process.

Production Increase

As can be seen by the results obtained, the increase of production obtained by HDT of the mixture of vegetable hydrocarbon oil with a normal load of mineral hydrocarbon oil is linked to cases in which low availability of mineral oil prevents the complete fulfillment of the production and the consumer market demands. By using this process, the $C_{10}$-$C_{13}$ production is increased as well as the production from the $C_{13}^+$ stream (that is used as drilling fluid). Graphs 2 and 3 below show the percentage of production increase of N-paraffins ($C_{10}$-$C_{13}$ and $C_{13}^+$, respectively) according to the addition of different concentrations of vegetable oil to kerosene.

The description of this process, as well as the Figures, Graphs and Tables that accompany this document, prove the excellence of this invention in the sense of present a process where the addition of an amount of a natural oil or natural fat to a load of petroleum hydrocarbon in hydrotreatment processing.

The process of this invention overcomes problems resulting from the need for an increase in production of N-paraffins in situations in which kerosene availability is limited by the capacity of refining in the operational unit, offering alternative of inputs in which normal processing will produce N-paraffins with improved characteristics besides an increase in weighting that results in economical advantages in final results. Also, it is possible to adapt the nature of the vegetable oil used for refinery purposes in terms of the $C_{10}$-$C_{13}$ content of N-paraffin product obtained, and that also provides an increase in the production of $C_{13}^+$, which may reach double that which would be obtained by using pure kerosene. The production of $C_{13}^+$ is valuable as a production asset, due to the fact that its qualities make it a product used in the petroleum industry as drilling fluid.

Although this invention has been presented in its preferred implementations regarding some of the compositions of the mixture of kerosene and vegetable oil load to be submitted to hydrotreatment, and the specification described so far be considered to be sufficient to allow those well versed in the technology to put the invention into practice, This inventive process is not limited in its scope to the examples presented, since these are intended to be just an illustration and serve as a base for other modifications and alterations introduced into the context of the inventive concept, which may be practiced, as long as they do not deviate from the essential concept.

Vegetable oils of other types that are functionally equivalent and comply with the fundamental requirements of use in this invention are considered covered by the scope of this invention, and are placed within the spirit of the scope of the invention.

In this way, various modifications of the invention as far as to the nature and range of vegetable/mineral hydrocarbon oil content to be used in mixtures of vegetable/mineral hydrocarbon oil, in addition to those presented and described here, will become clear for those well versed in the technology from the description presented, which will be experienced according to the increase in N-paraffins fractions aiming at economic gains according to their destinations and industrial uses. Such changes are introduced into the scope of the attached claims.

TABLE 1

PARAMETERS OF THE MIXTURES BEFORE HDT

| Loads | Kerosene without Vegetable Oil | Kerosene 10% vol Babassu Oil | Kerosene 30% vol Babassu Oil | Kerosene 10% vol Ouricuri Oil | Kerosene 30% vol Ouricuri Oil | Kerosene 10% vol Palm Kernel Oil |
|---|---|---|---|---|---|---|
| Density @ 20/4° C. | 0.7493 | 0.7666 | 0.8009 | 0.7669 | 0.8012 | 0.7662 |

TABLE 1-continued

PARAMETERS OF THE MIXTURES BEFORE HDT

| Loads | Kerosene without Vegetable Oil | Kerosene 10% vol Babassu Oil | Kerosene 30% vol Babassu Oil | Kerosene 10% vol Ouricuri Oil | Kerosene 30% vol Ouricuri Oil | Kerosene 10% vol Palm Kernel Oil |
|---|---|---|---|---|---|---|
| Refraction Index @ 20° C. | 1.4230 | 1.4270 | 1.4340 | 1.4270 | 1.4333 | 1.4269 |

TABLE 2

PARAMETERS OF THE MIXTURES AFTER HDT

| Loads after HDT | Kerosene without Vegetable Oil | Kerosene 10% vol Babassu Oil | Kerosene 30% vol Babassu Oil | Kerosene 10% vol Ouricuri Oil | Kerosene 30% vol Ouricuri Oil | Kerosene 10% vol Palm Kernel Oil |
|---|---|---|---|---|---|---|
| Density @ 20/4° C. | 0.7497 | 0.7495 | 0.7518 | 0.7494 | 0.7505 | 0.7499 |
| Refraction Index @ 20° C. | 1.4227 | 1.4227 | 1.4243 | 1.4226 | 1.4230 | 1.4224 |

TABLE 3

CONTENT OF AROMATICS AFTER HDT

| Loads after HDT | Kerosene without Vegetable Oil | Kerosene 10% vol Babassu Oil | Kerosene 30% vol Babassu Oil | Kerosene 10% vol Ouricuri Oil | Kerosene 30% vol Ouricuri Oil | Kerosene 10% vol Palm Kernel Oil |
|---|---|---|---|---|---|---|
| Level of Aromatics in N-paraffins by UV (IFP) % by weight | 0.0001 | 0.0000 | 0.0001 | 0.0001 | 0.0001 | 0.0001 |

Where UV (FPI): Ultraviolet method procedure of France Petroleum Institute

The invention claimed is:

1. Process to obtain N-paraffins from vegetable oil in a mixture with mineral hydrocarbon oil, in the presence of a hydrogen stream, hydroconversion catalysts and operational conditions for hydroconversion reactions to obtain N-paraffins, wherein the process comprises:
    a) providing a first stream comprising a vegetable hydrocarbon oil in the $C_{12}$-$C_{14}$ range and/or natural fat;
    b) providing a second stream comprising a mineral hydrocarbon oil;
    c) mixing the first and second streams of (a) and (b);
    d) performing hydrotreatment of the mixture obtained in (c) in a hydroconversion reactor under temperatures in the range of 280° C. to 320° C., spatial velocity of 0.5 $h^{-1}$ to 2 $h^{-1}$, hydrogen load ratio of 200 NL of hydrogen/L of a 1000 NL hydrogen/L and pressure at 7 MPa to 15 MPa in the presence of a catalyst, hydrogen stream, pressure, and temperature and obtaining a third stream comprising hydrocarbons;
    e) directing the third hydrocarbon stream obtained in (d) to a rectifier to remove sulfide gas and ammonia;
    f) recovering the resulting effluent stream comprising N-paraffins in the $C_{10}$-$C_{13}$ range, in a content of above 98% in weight, and a boiling point at the range of kerosene's boiling point.

2. Process in accordance with claim 1, wherein the catalyst referred to in (d) is a Group VI and Group VIII sulfided catalyst.

3. Process in accordance with claim 1, wherein the vegetable hydrocarbon oil is selected among palm kernel oil (*Elaeis guineensis*), babassu oil (*Orbignya speciosa*), and ouricuri/licuri oil (*Syagrus coronata* (Martius) Beccari), which are pure or mixed in any proportion.

4. Process in accordance with claim 1, wherein the natural fat is mixed, in any proportion, to the first stream comprising vegetable hydrocarbon oil.

5. Process in accordance with claim 1, wherein the first stream comprising vegetable hydrocarbon oil is used in a proportion by weight of up to 50% in relation to the mineral hydrocarbon oil.

6. Process in accordance with claim 1, wherein the first stream comprising vegetable origin and/or natural fat be used in a proportion by weight of up to 30% in relation to a mineral origin.

7. Process in accordance with claim 1, wherein the N-paraffin stream is incorporated to diesel to improve a quality of diesel due to an elevated cetane number.

8. Process in accordance with claim 1, wherein the natural fat is used in a proportion by weight of between 10% and 50% in relation to the mineral hydrocarbon oil.

9. Process in accordance with claim 4, wherein the vegetable hydrocarbon oil is used in a proportion by weight of between 10% and 50% in relation to the mineral hydrocarbon oil.

* * * * *